June 1, 1965 E. H. PETERS 3,187,288
PRECISION POTENTIOMETER
Filed July 23, 1962 2 Sheets-Sheet 1
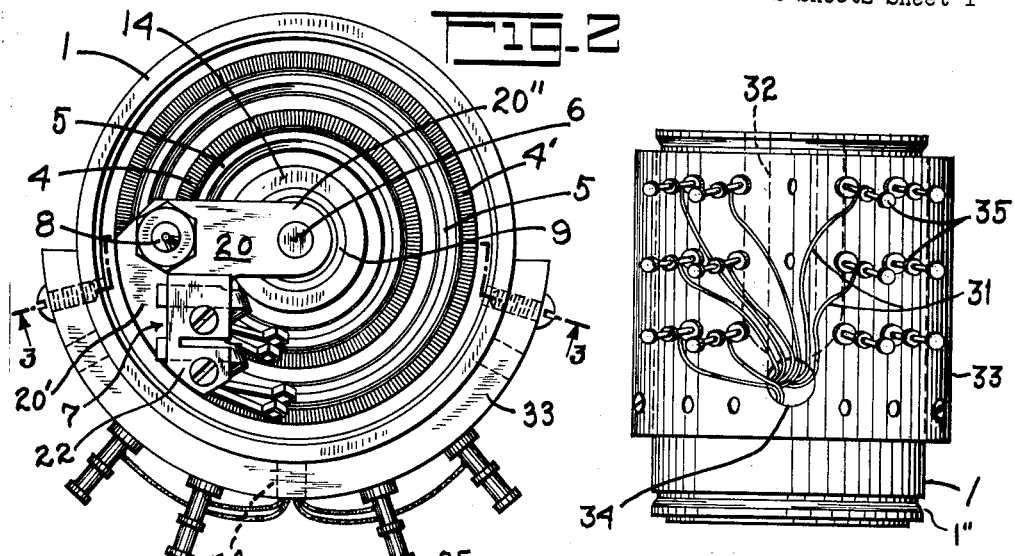
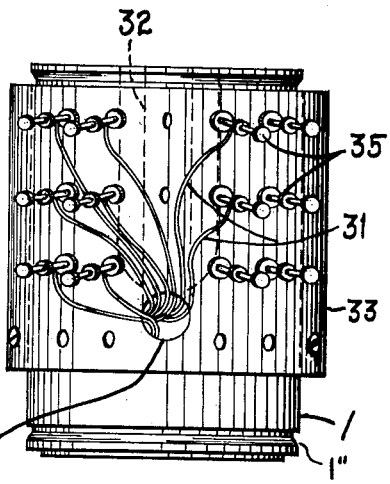
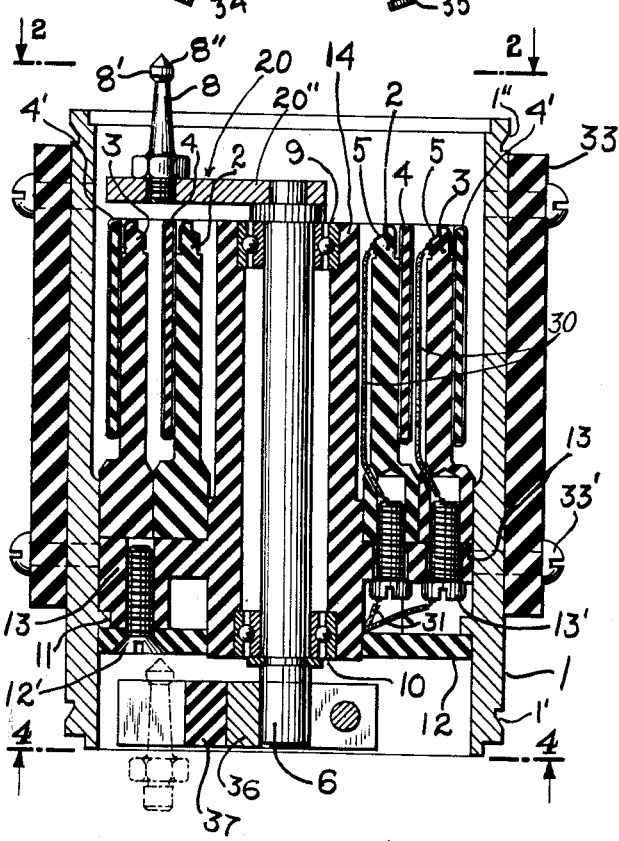
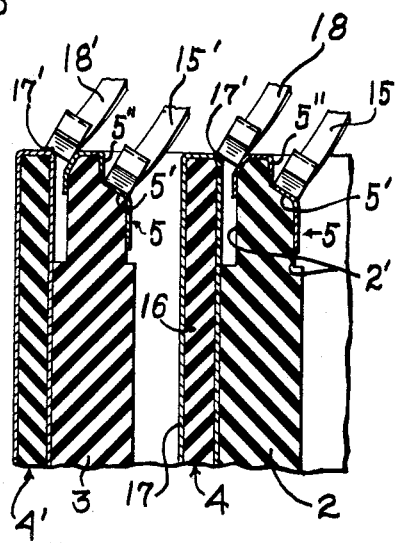
INVENTOR.
ELWYN H. PETERS
BY
HIS ATTORNEY

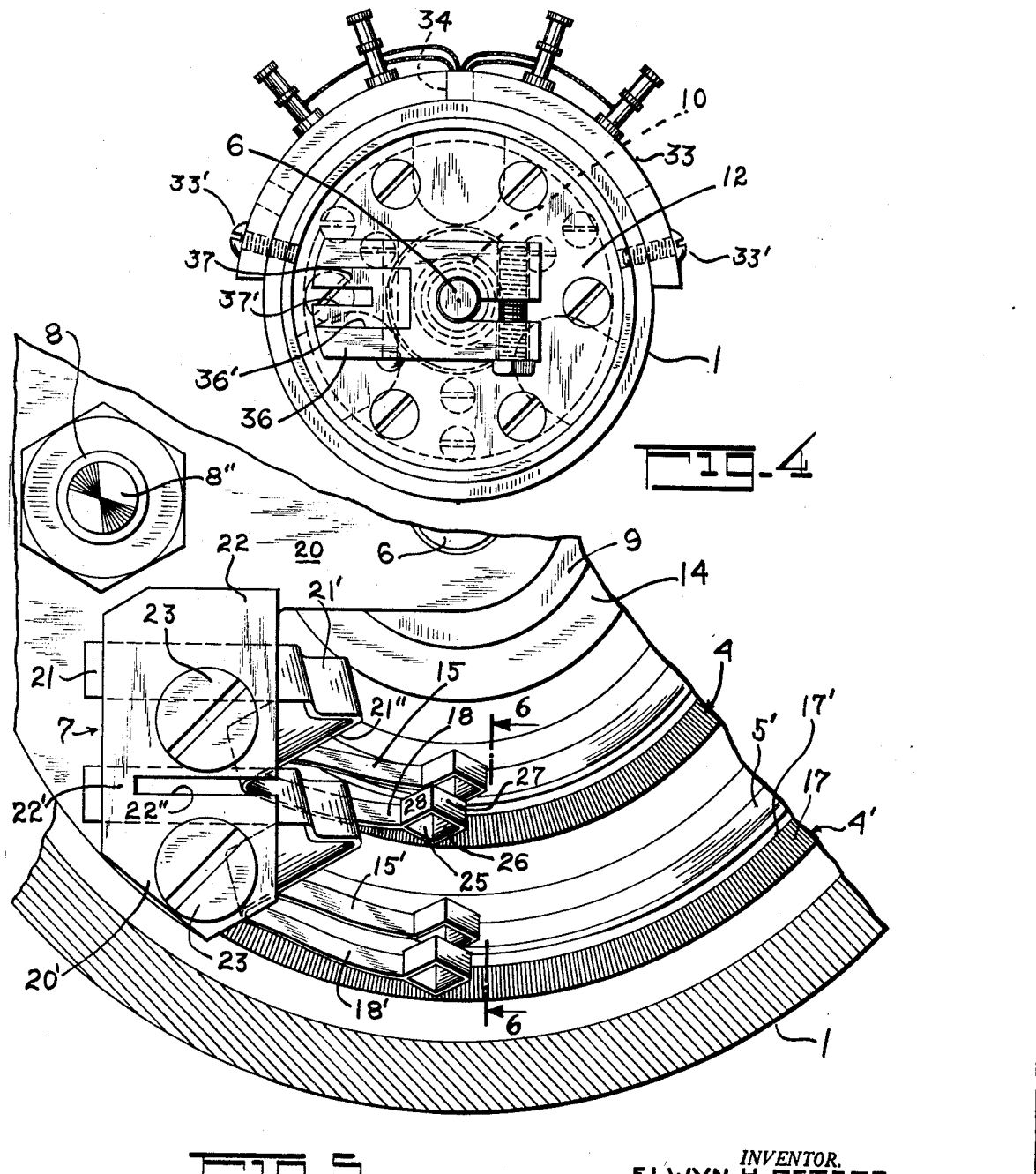

United States Patent Office 3,187,288
Patented June 1, 1965

3,187,288
PRECISION POTENTIOMETER
Elwyn H. Peters, Hasbrouck Heights, N.J., assignor to Curtiss-Wright Corporation, a corporation of Delaware
Filed July 23, 1962, Ser. No. 211,650
11 Claims. (Cl. 338—174)

This invention relates to potentiometers and in particular to compactly designed potentiometers for high precision operation in electric circuits such as analog computer circuits and the like, where a high degree of resolution is required.

The conventional wound-card type potentiometer (hereinafter for brevity called "pot") comprises a drum around which a contoured wound card is wrapped, and an operating shaft with wiper contacts mounted centrally of the drum for engaging the card resistance wire. The wiper contacts often make non-uniform contact with respective turns of wire, especially where the shaft is operable in both directions. In general, the conventional pot has been acceptable for many uses where high precision and compactness are not critical. However, where both compactness in design and high precision are required, its disadvantages, including non-uniform wiper contact engagement, or "chattering" during movement of the wiper contacts, excessive "stepping" of voltage pick-off due to a wiper contact bridging several turns of resistance wire in a given position, non-linear follow-up of contact positioning, etc., all resulting in poor resolution, make this pot unacceptable.

Although small-size pots for precision operation have been proposed, inherent faults in the construction thereof often result in improper wiper contact pressure and engagement with the resistance wire, take-off connections that may involve excessive resistance from the wiper contacts to the slip-rings and external circuits, etc.

A principal object of the present invention therefore is to provide an improved and highly efficient compact potentiometer of the aforesaid wound-card type that has high resolution and precision for continuous voltage pick-off, wherein shaft-angle relationship to the derived voltage is substantially uniform, and that has for practical purposes, both minimum weight and diameter.

A more specific object of the invention is an improved potentiometer assembly that has direct, low resistance electrical connections from the pot card to the wiper contacts, slip-rings and terminals, and that has a unitary wiper contact sub-assembly arranged to make direct and efficient electrical contact between the card wire and slip-rings throughout all movements and angular positioning of the contact assembly.

In particular, the wiper contact assembly is carried at a point on the operating shaft adjacent to the contact edge of the card wire, and a corresponding slip-ring is located adjacent to and concentrically of the aforesaid card edge so that the wiper portions of the contact assembly can engage through a minimum-path connection both the card edge and slip-ring at their inner edges respectively, for highly efficient contact resolution in all angular positions of the operating shaft.

The invention will be more fully set forth in the following description referring to the accompanying drawings, and the features of novelty will be pointed out with particularity in the claims annexed to and forming a part of this specification.

Referring to the drawings,

FIG. 1 is an elevational view showing the general exterior form of the potentiometer;

FIG. 2 is a plan end view, with reference to FIG. 1, also showing the exterior form;

FIG. 3 is a sectional view taken along the line 3—3 of FIG. 2;

FIG. 4 is an end view taken from the opposite side of FIG. 2;

FIG. 5 is an enlarged view, in plan, showing the arrangement of the wiper contacts and corresponding wound cards and slip-rings, and FIG. 6 is a sectional view of the wiper contact arrangement taken along the line 6—6 of FIG. 5.

The basic structure of the precision pot embodying the present invention comprises a cylindrical casing 1, FIGS. 1 to 3, that has mounted therein a plurality of concentrically disposed cylindrical insulating drums 2 and 3, each for supporting a wound card 4 that is wrapped around the drum and a corresponding slip-ring 5, respectively.

In the present instance a so-called dual-pot is disclosed, i.e. two pot cards with corresponding slip-rings. However, it will be understood, depending on requirements, that additional pot cards can be used in the assembly, as for example a four card, or so-called quad-pot in similar arrangement.

A central operating shaft 6 is rotatably mounted within the casing as presently described and carries at one end contact structure constituting a wiper contact assembly 7 for engaging the wound card and slip-ring of each pot unit respectively, and at its other end a driving member 8 for rotating the shaft and positioning the contact assembly accordingly. The shaft is mounted in spaced bearings 9 and 10 positioned at opposite ends of the casing so that the shaft is free of eccentricity. This ensures accurate positioning of the wiper contact assembly for uniform voltage pick-off, as well as more uniform contact engagement at the wound card and its slip-ring. The shaft 6, drums 2 and 3, wound cards 4 and 4' and corresponding slip-rings 5 all have a common longitudinal axis.

An important feature of the invention is the specific arrangement of contact assembly, wound cards, and slip-rings for making contact only along a surface that is "banked" or oblique with reference to the common longitudinal axis. In the preferred form, the banked surface contact takes place at the inner edge of the card wire loops, and at a slip-ring portion angled toward the shaft, so that any centrifugal forces due to rapid movement of the contact assembly acts to maintain the respective wiper contacts in good contact engagement with the corresponding contact surfaces. In other words, the operation is generally analogous to a car moving around a banked race track wherein the car wheels are held in firm engagement with the track by centrifugal force.

Furthermore, the arrangement uses to best advantage resiliency of the wiper contacts in maintaining at all times good contact engagement.

Referring specifically to FIGS. 2, 3, and 5, the aforesaid concentric drums 2 and 3 are positioned within the casing 1 by means of an inner annular ridge 11 wherein the casing. To this end, an insulating end plate 12 abuts the lower shoulder of the ridge, FIG. 3, and is secured as indicated at 12' to a peripheral flange 13 that forms a part of the insulating tubular support 14. This support receives the bearings 9 and 10 for the shaft 6. The drums are in turn secured as indicated at 13' to the flange 13. Accordingly, the assembly constituting the drums and shaft support is mounted in fixed relation to the casing.

As the drums and their associated slip-rings and pots are essentially similar in construction, the description of one drum unit will suffice. The inner drum 2, for example, is formed as an open end insulating cylinder secured as above described at its lower end, FIG. 3, to the fixed shaft support 14. The upper end is recessed at the opposite sides and shaped as illustrated to receive the conducting slip ring 5. The ring fits over the edge of the drum, and the inner side thereof extends for a limited distance into the drum. The aforesaid inner side of the slip-ring is offset as shown to form a contact portion 5' that makes an angle of approximately 45° with respect to the plane of the slip-ring. The contact surface so formed is engaged by a brush or wiper contact 15 hereinafter described in more detail. In this arrangement, the wiper contact 15 and slip-ring at 5' make oblique contact with reference to the longitudinal axis of the drum and slip-ring. It will be noted that the wiper contact 15 is for practical purposes maintained as to lateral engagement, with the slip-ring at 5', by reason of a vertical shoulder 5" formed by the drum edge and slip-ring at the outer periphery of the slip-ring contact surface.

The drum 3 has also mounted on its outer side a wound-card type potentiometer 4. In this form, an insulating card 16 is contoured along its lower edge (not shown) in well-known manner to represent the particular pot function, and the card is wound with fine gauge resistance wire 17 in a direction parallel to the drum axis with the loop ends at upper and lower edges of the card, FIG. 3. The upper edge, FIG. 6, of the card defines a horizontal plane, and the resistance wire at the inner corner edge 17' is directly engaged by another wiper contact 18. The wiper contacts 15 and 18, it will be noted, make substantially the same angle with the respective contact surfaces at the slip-ring and card respectively, i.e. contact engagement is oblique with reference to the longitudinal axis.

The wiper contacts 15 and 18 for the drum unit 2 constitute part of the contact assembly 7, FIGS. 2 and 5, that is movable around the card and slip-ring by the shaft 6. A second pair of wipers 15' and 18' also are included in the assembly 7 for the second drum unit 3. The contact assembly is mounted on one arm 20' of a member 20 of bellcrank shape, the other arm 20" being secured to the shaft 6. The member 20 also carries the drive pin 8 above referred to.

Each pair of wiper contacts forms an individual contact unit having a common conducting strip or extension (21 and 21' respectively) that is arranged to be adjustably secured to the assembly arm 20' by means of an insulating clamping plate 22. This plate overlies the contact strips, and clamps them in proper position on the arm 20' by separately adjustable means, including the screws 23, FIG. 5. Separate adjustment of the wiper contact units is accomplished through a comparatively flexible part 22' of the clamping plate that is formed by a slot 22" extending part away from the front edge of the plate. This provides for separate adjustment of a contact unit with respect to its card and slip-ring. Accordingly, assuming proper adjustment of the wiper contacts, rotation of the shaft 6 through a predetermined angle positions the card wiper 18 at a corresponding angular position on the card for proper voltage pick-off. A direct, minimum length connection is provided between the card and its slip-ring through the extension strip 21 that is common to the wiper portions 15 and 18.

Configuration of each wiper contact unit is best shown in FIG. 5 wherein the clamped extension strip 21 is bent downwardly at the inner edge of the supporting arm 20', the bend making a small angle with the edge of the arm, to form a short offset portion 21'. A further downwardly bent portion 21" extending from the offset portion forms a re-entrant or acute angle with respect to the clamped portion, and the wipers 15 and 18 extend outwardly therefrom in the opposite direction and at a depressed angle toward the respective slip-ring and card. In a preferred arrangement, the strip 21 at or adjacent the lower end of the re-entrant portion is bifurcated to form the separate wipers.

An important feature of the wiper contacts is the configuration at the contact-making end. Taking wiper 18, for example, the wiper strip has a portion 25 bent downwardly about 45°, followed by successive inwardly bent portions 26, 27, and 28 to form a closed or substantially closed loop, preferably in the form of a parallelogram. The common edge or junction of the portions 25 and 26 forms the contact surface for engaging the edge 17' of the card wire, and the corresponding contact surface of the other wiper 15 makes full-line contact with the banked slip-ring contact surface 5'. It has been found that the configurations above described result in greatly improved contact engagement, both as to relative clockwise and counter-clockwise rotation of the shaft 6, maintenance of proper wiper positions with respect to the card and slip-ring, and high precision as regards voltage pick-off at the card; further, the arrangement provides an efficient low-resistance and short-path connection between a card and its slip-ring.

The electrical connections from the card and slip-ring to the external terminals of the pot are conveniently and compactly arranged so as to avoid exposed connections at either end of the pot casing. Referring to FIGS. 1 and 3, the slip-ring leads 30 for example extend downwardly within the respective drum to the assembly-terminal screws 13'. The leads 31 extend from the terminal screws beneath the shaft-tube flange 13 outwardly through the casing 1 by way of a slot 32, FIG. 1, that extends part way along the length of the casing. In similar manner, the required leads (not shown) from a respective card extend downwardly and outwardly through the casing.

Overlying the slot is an insulating terminal panel 33 secured to the casing at 33' and having an aperture 34 in alignment with the slot at its closed end. The leads extend from the slot through this aperture to appropriate external circuit terminals 35 on the panel.

The panel conforms to the shape of the casing and in the present instance extends about 180° around it, FIG. 2. With this arrangement, the pot casing and panel together form a neat, compact unit for ready application to a servo and to external circuitry.

Where more than one pot is required, as for stacked-pot servo application, the shaft 6 receives the driving torque at one end from the servo motor, or from an adjacent stacked pot, and transmits torque at its other end to the next stacked pot. At the torque-receiving end, the shaft has an arm 36 secured thereto, FIG. 4, that is slotted at 36' to receive, in turn, a slotted insert 37 composed of a good bearing material, such as "nylon." The slot 37' formed in the insert may be rectangular and is adapted to receive a drive pin 8, FIG. 3, of an adjacent unit. The pin 8 is preferably formed as a tapered portion extending from the shaft member 20 longitudinally of the shaft. The driving end is formed as a slightly enlarged cylindrical portion 8' adapted to fit within the insert slot 37', and terminates in a conical portion 8". This arrangement has been found to result in smooth and uniform drive for accurate angular positioning of the wiper contacts of the corresponding stacked units.

The precision pot herein disclosed also lends itself to a number of special applications, uses, and assembly techniques not heretofore believed possible in a given pot design. For example, the mounting of the card and slip-ring at the edge of a single drum which is formed so as mechanically to separate the closely spaced brushes or wipers permits optimum compactness as well as accurate preassembly of a drum unit; also the slip-ring itself can be segmented as desired for switching purposes. Preassembly of the multiple drums, bearing support or hub, and shaft and contact assembly as a single unit is done before insertion in the casing, thereby ensuring accurate calibration and fitting of parts.

For maximum facility in handling multiple leads, slots (not clearly shown) at the drum base, together with the hollow hub 14 (bearing support), which may form a wire duct, provide comparatively large wiring space where a material number of pot taps and multiple pots are required. The configuration of the wiper contact assembly permits relatively large deflection of the wipers without permanent "set" or change in the predetermined normal delicate wiper contact pressure, such as 13 grams. This allows for manufacturing tolerances not altering brush tension beyond allowable limits. Pre-adjustment and maintenance adjustment of the wiper assembly is greatly facilitated since disassembly of elements is not necessary. Referring again to FIG. 5, the clamping plate 20' preferably is provided at its lower side with shallow rectangular guide and position grooves corresponding in width to the wiper connection strip 21, but of less depth than the strip thickness. Thus, when the clamp is loosened at either screw 23, the respective wiper strip can readily be adjusted axially independently of the other strip due to the comparative resilience of the reduced clamp section 22' as previously described.

Where involved servo systems are required, as in analog computers, the inherent pot compactness is maintained even in stacked units as the casing ends are formed as shown at 1' and 1" to mate flush with the casings of adjacent units.

It should therefore be understood that the precision pot of this invention is not limited to specific details of construction and arrangement thereof herein illustrated, and that changes and modifications may occur to one skilled in the art without departing from the spirit of the invention.

What is claimed is:

1. A precision potentiometer comprising a cylindrical support for a card wound along its transverse axis with fine-guage resistance wire, said card being wrapped around said support so that one edge of the wound card is in corresponding position with one end of the support at its edge, a rotatable operating shaft aligned with the longitudinal axis of said support, pick-off contact structure carried by said shaft at a point adjacent the aforesaid edges of the card and support respectively, and a slip-ring concentrically mounted with respect to the aforesaid card edge on said one end of the support, said contact structure having at least two contact-making portions, one of which engages respective loop ends of the resistance wire at said card edge and the other engages the slip-ring, each contact-making portion arranged to make oblique wiping contact respectively with the slip-ring and the resistance wire loops so that right-angle components of contact pressure, referring to said axis, act on both the resistance wire and slip-ring during angular adjustment of the contact structure by said shaft.

2. A precision potentiometer as specified in claim 1 wherein the contact structure is a compact assembly and comprises a pair of resilient brush-type wiper contacts diposed side by side, said wiper contacts having contact-making surfaces, each being biased to engage respectively the card resistance wire loops and slip-ring obliquely, as referred to the support axis.

3. A precision potentiometer as specified in claim 1 wherein the support is an insulating drum and the slip-ring mounted thereon is provided with a continuous contact surface that extends around the inner wall of the drum at said one end and that is banked inwardly at an acute angle with reference to the aforesaid support axis.

4. A precision potentiometer as specified in claim 3 wherein one wiper contact engages obliquely the inner corner of the resistance wire loops contact nearest the shaft, and the other wiper contact engages the banked surface of the slip-ring.

5. A precision potentiometer as specified in claim 3 wherein the slip-ring surface at the inner wall of the drum has a wiped-contact position banked at about 45° with respect to the drum axis and a portion of greater diameter continuous therewith, that extends to the outer edge of the drum substantially parallel to said axis to form a conducting shoulder limiting any outward radial movement of the coacting ring-wiping contact due to centrifugal force.

6. A precision potentiometer of the wound-wire-card type as specified in claim 1, wherein the contact-making portion engaging the resistance wire comprises an elongated resilient conducting strip having a contact end in the shape of a parallelogram and positioned so that one corner of the parallelogram engages solely the inner edge of the card loops nearest the shaft.

7. A precision potentiometer of the circular wound-card type having a cylindrical casing, an insulating cylindrical drum concentrically mounted within said casing, an insulating card extending around the outer surface of the drum and wound with resistance wire in closely spaced loops that are generally parallel to the longitudinal axis of said drum, the loop ends at one edge of the card being in substantial transverse alignment with the corresponding end edge of said drum, a conducting slip-ring also mounted on said drum on said end edge, an operating shaft centrally mounted in said casing in alignment with the longitudinal axis of said drum, and a contact assembly carried by said shaft and having a pair of resilient wiper contacts, said wiper contacts extending obliquely with respect to the drum axis for engaging the wire loops at said card edge and the slip-ring on the drum edge, respectively.

8. A precision potentiometer as specified in claim 7 wherein the wiper contacts each extend toward the wound card end loops and slip-ring respectively, at an acute angle with respect to said drum axis, so as to make contact only along the inner edge portions facing the shaft of the aforesaid wound card loops and slip-ring, respectively.

9. A precision potentiometer as specified in claim 8 wherein the wiping portion of the contact engaging the wound card edge has the form of an acute angle, and the apex thereof engages the wound card loops at the aforesaid inner edge thereof at an angle of approximately 45°.

10. A precision potentiometer of the multiple-unit type having a casing, a plurality of circular insulating supports telescoped in spaced concentric relation in said casing, a circular resistance element mounted on each support, a slip-ring mounted at an end of each support, a contact assembly having a pair of wiper contacts for each related pair of resistance elements and slip-rings, an operating shaft mounted centrally in said casing, and a common support for the respective contact assemblies carried by said shaft, said support being permanently deformable by flexing and being reduced in cross-section between each assembly for separate adjustment of each assembly with respect to its related resistance element and slip-ring.

11. A precision potentiometer of the multiple-unit type having a casing, a plurality of circular insulating supports telescoped in spaced concentric relation in said casing, each support having concentrically mounted on a surface thereof a resistance element and on a circular end thereof a companion slip ring, a plurality of contact assemblies each having two wiper contacts for engaging the resistance element and slip ring respectively of a corresponding support, an operating shaft mounted centrally of said supports in said casing, and a unitary contact carrier secured to said shaft for rotation therewith and having individual portions to which respective assemblies are secured, said unitary carrier having a flexible, deformable portion interconnecting said individual portions for separate bodily adjustment of each assembly for ensuring individual contact engagement with the corresponding resistance element and slip ring at the proper contact angle and pressure.

References Cited by the Examiner
UNITED STATES PATENTS

| | | | |
|---|---|---|---|
| 1,605,871 | 11/26 | Thordarson | 338—202 |
| 2,120,651 | 6/38 | Schellenger | 338—132 |
| 2,476,294 | 7/49 | Hampton | 338—174 |
| 2,480,995 | 9/49 | Armitage | 338—174 X |
| 2,525,993 | 10/50 | Youngbeck et al. | 338—132 |
| 2,657,295 | 10/53 | Barclay | 338—174 X |
| 2,694,127 | 11/54 | Fearn | 338—174 X |
| 2,721,246 | 10/55 | Bourns | 338—202 |
| 2,738,405 | 3/56 | Jorgensen et al. | 338—174 X |
| 2,782,288 | 2/57 | Weld | 338—174 |
| 2,798,137 | 7/57 | Rasmussen | 338—174 |
| 2,859,319 | 11/58 | Karg | 338—174 X |
| 2,863,972 | 12/58 | Barton | 338—174 X |
| 2,926,323 | 2/60 | Mucher | 338—174 |

RICHARD M. WOOD, *Primary Examiner.*
ANTHONY BARTIS, *Examiner.*